(12) United States Patent
Lippey et al.

(10) Patent No.: US 7,520,624 B2
(45) Date of Patent: Apr. 21, 2009

(54) LIGHT ENHANCING

(75) Inventors: Barret Lippey, Belmont, MA (US); Stephen R. O'Dea, Wilmington, MA (US); James F. Shanley, Westboro, MA (US)

(73) Assignee: Bose Corporation, Framingham, MA (US)

( * ) Notice: Subject to any disclaimer, the term of this patent is extended or adjusted under 35 U.S.C. 154(b) by 344 days.

(21) Appl. No.: 10/893,461

(22) Filed: Jul. 16, 2004

(65) Prior Publication Data

US 2005/0105176 A1 May 19, 2005

Related U.S. Application Data

(63) Continuation-in-part of application No. 10/028,063, filed on Dec. 21, 2001, now Pat. No. 6,847,483, and a continuation-in-part of application No. 10/789,695, filed on Feb. 27, 2004.

(51) Int. Cl.
*G03B 21/20* (2006.01)
*G03B 21/26* (2006.01)

(52) U.S. Cl. .......................... 353/85; 353/94

(58) Field of Classification Search .............. 353/85, 353/89, 94, 30; 362/227–228, 253–254
See application file for complete search history.

(56) References Cited

U.S. PATENT DOCUMENTS

| 1,998,054 A | 4/1935 | McBurney ............. 359/452 |
| 2,590,906 A | 4/1952 | Tripp |
| 3,314,742 A | 4/1967 | Morgan |
| 3,556,640 A | 1/1971 | Austin |
| 3,712,708 A | 1/1973 | Brown ............... 359/459 |
| 3,942,869 A | 3/1976 | Portner et al. |
| RE29,091 E | 12/1976 | De Palma et al. ....... 359/451 |
| 4,190,320 A | 2/1980 | Ferro |
| 4,206,969 A | 6/1980 | Cobb et al. |
| 4,312,939 A | 1/1982 | McCole |
| 4,979,803 A | 12/1990 | McGuckin et al. |
| 5,148,309 A | 9/1992 | Yamada et al. |
| 5,164,858 A | 11/1992 | Aguilera, Jr. et al. |
| 5,193,015 A | 3/1993 | Shanks ............. 359/443 |
| 5,214,530 A | 5/1993 | Coombs et al. |
| 5,335,022 A | 8/1994 | Braun et al. |
| 5,361,163 A | 11/1994 | Matsuda et al. |
| 5,383,995 A | 1/1995 | Phillips et al. |
| 5,389,982 A | 2/1995 | Lee .................. 353/37 |
| 5,400,174 A | 3/1995 | Pagis et al. .......... 359/359 |

(Continued)

FOREIGN PATENT DOCUMENTS

DE 44 42 045 5/1996

(Continued)

OTHER PUBLICATIONS

Young, Leo, Multilayer Interference Filters with Narrow Stop Bands, Feb. 1967, vol. 6, No. 2 Applied Optics, pp. 297-312.

(Continued)

*Primary Examiner*—Christopher Mahoney
(74) *Attorney, Agent, or Firm*—Fish & Richardson P.C.

(57) ABSTRACT

Broader spectrum light is enhanced with light of a narrower spectrum.

12 Claims, 9 Drawing Sheets

U.S. PATENT DOCUMENTS

| | | | |
|---|---|---|---|
| 5,416,617 A | 5/1995 | Loiseaux et al. | |
| 5,473,469 A | 12/1995 | Magocs et al. | |
| 5,486,884 A | 1/1996 | De Vaan | |
| 5,497,207 A | 3/1996 | Kim | |
| 5,526,063 A | 6/1996 | Joubert et al. | 348/744 |
| 5,568,316 A | 10/1996 | Schrenk et al. | |
| 5,570,213 A | 10/1996 | Ruiz et al. | |
| 5,571,624 A | 11/1996 | Phillips et al. | |
| 5,625,494 A | 4/1997 | Fukushima | |
| 5,646,781 A | 7/1997 | Johnson, Jr. | |
| 5,715,083 A | 2/1998 | Takayama | |
| 5,726,805 A | 3/1998 | Kaushik et al. | |
| 5,731,898 A | 3/1998 | Orzi et al. | |
| 5,739,296 A | 4/1998 | Gvon et al. | |
| 5,760,954 A | 6/1998 | Tatsuki et al. | |
| 5,765,934 A * | 6/1998 | Okamori et al. | 353/94 |
| 5,768,019 A | 6/1998 | Niwa et al. | |
| 5,832,146 A | 11/1998 | Bruno | |
| 5,875,012 A | 2/1999 | Crawford et al. | |
| 5,877,895 A | 3/1999 | Shaw et al. | |
| 5,880,800 A | 3/1999 | Mikura et al. | 349/122 |
| 5,914,817 A | 6/1999 | Browning et al. | |
| 6,018,419 A | 1/2000 | Cobb, Jr. et al. | |
| 6,023,369 A | 2/2000 | Goto | 359/443 |
| 6,031,653 A | 2/2000 | Wang et al. | |
| 6,072,549 A | 6/2000 | Faris et al. | |
| 6,157,486 A | 12/2000 | Benson, Jr. et al. | |
| 6,163,402 A | 12/2000 | Chou et al. | 359/443 |
| 6,183,091 B1 | 2/2001 | Johnson et al. | 353/20 |
| 6,208,463 B1 | 3/2001 | Hansen et al. | |
| 6,215,592 B1 | 4/2001 | Pelekhaty | |
| 6,248,448 B1 | 6/2001 | Lippey et al. | |
| 6,249,378 B1 | 6/2001 | Shimamura et al. | |
| 6,282,023 B1 | 8/2001 | Bergman | |
| 6,284,382 B1 | 9/2001 | Ishikawa et al. | |
| 6,288,172 B1 | 9/2001 | Goetz et al. | |
| 6,288,842 B1 | 9/2001 | Florczak et al. | |
| 6,307,675 B1 | 10/2001 | Abe et al. | 359/457 |
| 6,317,189 B1 | 11/2001 | Yuan et al. | |
| 6,339,464 B1 | 1/2002 | Anderson et al. | |
| 6,375,330 B1 | 4/2002 | Mihalakis | 353/31 |
| 6,381,068 B1 | 4/2002 | Harada et al. | |
| 6,391,068 B2 | 5/2002 | Yoshida et al. | |
| 6,392,766 B1 | 5/2002 | Gnaedig et al. | 359/443 |
| 6,398,389 B1 | 6/2002 | Bohler | |
| 6,414,727 B1 | 7/2002 | Benton | |
| 6,421,174 B1 | 7/2002 | Ooshima et al. | |
| 6,428,169 B1 | 8/2002 | Deter et al. | |
| 6,449,089 B1 | 9/2002 | Moshrefzadeh et al. | 359/454 |
| 6,525,877 B1 | 2/2003 | Clabburn et al. | |
| 6,529,322 B1 | 3/2003 | Jones et al. | 359/443 |
| 6,530,667 B1 | 3/2003 | Idaszak et al. | 353/122 |
| 6,561,654 B2 * | 5/2003 | Mukawa et al. | 353/31 |
| 6,590,710 B2 | 7/2003 | Hara et al. | |
| 6,618,199 B2 | 9/2003 | Cook | |
| 6,648,475 B1 | 11/2003 | Roddy et al. | |
| 6,650,455 B2 | 11/2003 | Miles | |
| 6,674,562 B1 | 1/2004 | Miles | |
| 6,680,792 B2 | 1/2004 | Miles | |
| 6,688,747 B2 | 2/2004 | Wichner et al. | 353/29 |
| 6,733,139 B2 * | 5/2004 | Childers et al. | 353/94 |
| 6,769,774 B2 | 8/2004 | McDowell | |
| 6,831,784 B2 | 12/2004 | Takeda | |
| 6,847,483 B2 | 1/2005 | Lippey et al. | |
| 6,894,835 B2 | 5/2005 | Ohsako et al. | |
| 6,956,702 B2 | 10/2005 | Pate | |
| 6,969,177 B2 | 11/2005 | Li et al. | |
| 6,988,806 B2 * | 1/2006 | Slobodin et al. | 353/31 |
| 7,035,006 B2 | 4/2006 | Umeya et al. | |
| 7,035,015 B2 | 4/2006 | Teijido | |
| 7,040,764 B2 | 5/2006 | Przybyla et al. | |
| 7,090,357 B2 * | 8/2006 | Magarill et al. | 353/94 |
| 7,234,817 B2 | 6/2007 | Paukshto | |
| 2001/0011779 A1 | 8/2001 | Stover | |
| 2002/0015215 A1 | 2/2002 | Miles | |
| 2002/0024711 A1 | 2/2002 | Miles | |
| 2002/0043157 A1 | 4/2002 | Pillion et al. | |
| 2002/0044445 A1 | 4/2002 | Bohler | |
| 2002/0063350 A1 | 5/2002 | Matsumoto | |
| 2002/0075555 A1 | 6/2002 | Miles | |
| 2002/0126354 A1 | 9/2002 | Jeong et al. | |
| 2002/0130994 A1 | 9/2002 | Karman | |
| 2002/0145708 A1 | 10/2002 | Childers et al. | 353/85 |
| 2002/0186349 A1 | 12/2002 | Wichner et al. | |
| 2003/0002016 A1 * | 1/2003 | Sellen et al. | 353/31 |
| 2003/0043346 A1 | 3/2003 | Kwok et al. | |
| 2003/0117704 A1 | 6/2003 | Lippey et al. | 359/443 |
| 2003/0128427 A1 | 7/2003 | Kalmanash et al. | |
| 2003/0128430 A1 | 7/2003 | Leu et al. | |
| 2003/0156326 A1 | 8/2003 | Lotz et al. | |
| 2003/0156328 A1 | 8/2003 | Goto et al. | |
| 2003/0179346 A1 | 9/2003 | Mihara | 353/31 |
| 2003/0214632 A1 | 11/2003 | Ma et al. | |
| 2004/0061935 A1 | 4/2004 | Ohsako et al. | |
| 2004/0150883 A1 | 8/2004 | Shimoda et al. | |
| 2004/0196551 A1 | 10/2004 | Chubachi et al. | |
| 2004/0233524 A1 | 11/2004 | Lippey et al. | |
| 2004/0240053 A1 | 12/2004 | Shimoda | |
| 2005/0030480 A1 | 2/2005 | Lippey et al. | |
| 2005/0105176 A1 | 5/2005 | Lippey et al. | |
| 2005/0207022 A1 | 9/2005 | Liu et al. | |
| 2005/0231800 A1 | 10/2005 | Lippey | |
| 2005/0241530 A1 | 11/2005 | Bruckner et al. | |

FOREIGN PATENT DOCUMENTS

| | | |
|---|---|---|
| DE | 197 47 597 | 8/1998 |
| DE | 199 01 970 | 8/2000 |
| EP | 0 442 738 | 8/1991 |
| EP | 0 490 391 | 6/1992 |
| EP | 0 493 863 | 7/1992 |
| EP | 0 551 127 | 7/1993 |
| EP | 0 609 593 | 12/1995 |
| EP | 0856768 A | 5/1998 |
| EP | 0 648 048 | 1/2002 |
| EP | 0 657 769 | 1/2002 |
| EP | 1324114 A2 | 7/2003 |
| EP | 1 341 387 | 9/2003 |
| GB | 511199 | 8/1939 |
| GB | 652859 | 5/1951 |
| GB | 2 388 992 | 11/2003 |
| JP | 56047012 | 4/1981 |
| JP | 62-178906 | 8/1987 |
| JP | 04-219745 | 8/1992 |
| JP | 05011344 A | 1/1993 |
| JP | 05216123 A | 8/1993 |
| JP | 06289491 | 1/1994 |
| JP | 06-43544 | 2/1994 |
| JP | 06082747 | 3/1994 |
| JP | 06148409 | 5/1994 |
| JP | HEI 6-289491 | 10/1994 |
| JP | 07-503348 | 4/1995 |
| JP | 07-152088 | 6/1995 |
| JP | 07-261274 | 10/1995 |
| JP | 07270915 | 2/1996 |
| JP | 08-186849 | 7/1996 |
| JP | 10-312027 | 11/1998 |
| JP | 11-174232 | 7/1999 |
| JP | H11-119002 | 8/1999 |
| JP | 2000-284908 | 10/2000 |
| JP | 2001-005412 | 1/2001 |
| JP | 2001-055646 | 2/2001 |
| JP | 2001-264750 | 9/2001 |
| JP | 2001-305649 | 11/2001 |

| | | |
|---|---|---|
| JP | 2003-050306 | 2/2003 |
| JP | 2003-121637 | 4/2003 |
| JP | 2003-248108 | 9/2003 |
| JP | 2003-337381 | 11/2003 |
| JP | 2004-029163 | 1/2004 |
| JP | 2004004821 A | 1/2004 |
| JP | 2004029267 A | 1/2004 |
| JP | 2004-038003 | 2/2004 |
| JP | 2004-061545 | 2/2004 |
| JP | 2004-117480 | 4/2004 |
| JP | 2004101558 | 4/2004 |
| JP | 2004-38002 | 5/2004 |
| JP | 2004-138938 | 5/2004 |
| JP | 2004-144882 | 5/2004 |
| JP | 2004-144883 | 5/2004 |
| JP | 2004-163806 | 6/2004 |
| JP | 2004-170959 | 6/2004 |
| WO | WO 93/15585 | 8/1993 |
| WO | WO 95/17690 | 6/1995 |
| WO | WO 97/01610 | 1/1997 |
| WO | 98/36320 | 8/1998 |
| WO | WO 00/41009 | 7/2000 |
| WO | 00/45220 | 8/2000 |
| WO | WO 00/57214 | 9/2000 |
| WO | WO 03/034145 | 4/2003 |
| WO | WO 03/050612 | 6/2003 |
| WO | WO 03/077027 | 9/2003 |
| WO | WO 03/077028 | 9/2003 |
| WO | WO 2004/031852 | 4/2004 |

OTHER PUBLICATIONS

Pelletier et al., Interference Filters with Multiple Peaks, Jun. 1982, vol. 72, No. 6 J. Opt. Soc. Am., pp. 663-687.

Shimoda, K., "Multi-Layer Dichroic Coating on Plastic Webs," *Proceedings of Thirteenth International Conference on Vacuum Web Coating*, R. Bakish, Ed., pp. 58-67, Tucson, AZ, Oct. 17-19, 1999.

Lotz, H. et al., "Thick Optical Multi-Layer Systems on PET Film," *Precision*, Nov. 2001, as printed from http://www.appliedfilms.com/Precision3/14_multilayer_systems/multilayer_systems_print.htm.

Search Report mailed Nov. 7, 2007 in counterpart European application No. 07102106.7 (8 pages).

High Reflectors. Datasheet [online]. JK Consulting, 2003 [retrieved on Sep. 10, 2007]. Retrieved from the Internet: <URL:http://kruschwitz.com/HR's.htm>.

Partial European Search Report dated Mar. 20, 2003 from European Application No. 02102872.5.

European Search Report dated May 30, 2003 from European Application No. 02102872.5.

Examiniation Report dated Mar. 1, 2004 from European Application No. 02102872.5.

EP Examination Report in Application No. 02102872.5, dated Oct. 18, 2004.

EP Examination Report in Application No. 02102872.5, dated May 13, 2005.

Partial European Search Report dated Jun. 14, 2005 from European Application No. 05101098.1.

EP Examination Report in Application No. 05101098.1, dated Oct. 6, 2005.

EP Examination Report in Application No. 02102872.5, dated Mar. 17, 2006.

International Search Report in corresponding Application No. PCT/US2006/000493, dated Jun. 16, 2006.

EP examination Report in Application No. 05101098.1, dated Feb. 16, 2007.

EP Search Report in Application No. 05101103.9, dated Mar. 12, 2007.

EP Partial Search Report in Application 07102106.7, dated May 18, 2007.

CN Office Action in Application No. 02157897.4, dated Jun. 8, 2007.

European Search Report dated Jul. 17, 2007 from European Application No. 05101103.9.

International Preliminary Report on Patentability in corresponding Application No. PCT/US2006/000493, dated Jul. 10, 2007.

JP Examination Report in Application No. 2002-371849, dated Mar. 27, 2008.

IN examination Report in Application No. 1064/MUM/2002, dated Apr. 10, 2008.

Examination Report dated May 19, 2008 from European Application No. 05101098.1.

Action and Response History retrieved from PAIR for U.S. Appl. No. 10/028,063, through May 29, 2008.

Action and Response History retrieved from PAIR for U.S. Appl. No. 10/931,608, through May 29, 2008.

Action and Response History retrieved from PAIR for U.S. Appl. No. 11/033,214, through May 29, 2008.

Action and Response History retrieved from PAIR for U.S. Appl. No. 11/548,373, through May 29, 2008.

Action and Response History retrieved from PAIR for U.S. Appl. No. 11/127,531, through May 29, 2008.

Action and Response History retrieved from PAIR for U.S. Appl. No. 10/789,695, through Jun. 3, 2008.

* cited by examiner

LIGHT ENHANCING

CROSS-REFERENCE TO RELATED APPLICATIONS

This application is a continuation-in-part of U.S. patent application Ser. No. 10/028,063, filed Dec. 21, 2001, and titled "Selective Reflecting", and a continuation-in-part of U.S. patent application Ser. No. 10/789,695, filed Feb. 27, 2004, each of which is incorporated here in its entirety by reference.

TECHNICAL FIELD

This description relates to light enhancing.

BACKGROUND

The light provided, for example, by an ultra-high-pressure (UHP) lamp or other high intensity discharge lamp in a digital projection system does not contain enough red light to balance the green light and blue light produced by the lamp.

A dichroic beam splitter may be used to combine light from a UHP lamp and red light from an additional light source to produce a combined output beam. The beam splitter excludes from the output beam the portion of light from the UHP lamp that is in the same spectral band as the red light from the additional source.

SUMMARY

In general, in one aspect, the invention features a method that includes: receiving a first amount of light having a narrower spectrum, reflecting the narrower spectrum light from a reflective surface on a color wheel of an image projector, and transmitting light having a broader spectrum, the broader spectrum light including a second amount of light having the narrower spectrum, light passing from the color wheel including the first amount and the second amount of the narrower spectrum light.

Implementations may include one or more of the following features. The broader spectrum light is deficient in the narrower spectrum. The narrower spectrum light comprises red light. The narrower spectrum light is in the range of 600 nm to 780 nm, or more specifically in the range of 620 to 640. The broader spectrum light is received from a high-energy discharge lamp. The high energy discharge lamp comprises an ultra high pressure lamp. The reflective surface lies in a plane that is not normal to an axis of the narrower spectrum light. The narrower spectrum light is pulsed in synchronism with rotation of the color wheel.

In general, in another aspect, the invention features a method that includes receiving a first amount of light having a narrower spectrum; at a color wheel, combining the narrower spectrum light with light having a broader spectrum to generate output light, the broader spectrum light including a second amount of light having the narrower spectrum, the output light including the first amount and the second amount of the narrower spectrum light; and pulsing the narrower spectrum light in synchronism with rotation of the color wheel.

Implementations may include one or more of the following features. The narrower spectrum light and the broader spectrum light approach the color wheel from different directions.

In general, in another aspect, the invention features a method that includes receiving a first amount of light having a narrower spectrum; at a color wheel, combining the narrower spectrum light with light having a broader spectrum to generate output light, the broader spectrum light including a second amount of light having the narrower spectrum, the output light including the first amount and the second amount of the narrower spectrum light, the narrower spectrum light and the broader spectrum light approaching the color wheel from different directions.

Implementations may include one or more of the following features. The narrower spectrum light is from a light emitting diode. The narrower spectrum light is from a laser. The narrower spectrum light is from a filament lamp. The filament of the lamp emits red light and infrared light, infrared light emitted by the filament is relatively preferentially reflected back to the filament, and red light emitted by the filament is relatively preferentially reflected away from the filament.

In general, in another aspect, the invention features an apparatus that includes a light processor including a color wheel having a light passing portion and a reflective surface to (a) reflect a first amount of light having a narrower spectrum from the reflective surface of the color wheel, (b) combine the reflected narrower spectrum light and light having a broader spectrum to generate output light, the broader spectrum light including a second amount having the narrower spectrum, and (b) deliver light including the first amount and the second amount of the narrower spectrum light.

Implementations may include one or more of the following features. A source of the broader spectrum light comprises a high-energy discharge lamp. The high-energy discharge lamp comprises an ultra high-pressure lamp. A source of the narrower spectrum light comprises a light emitting diode, or a laser.

In general, in another aspect, the invention features an apparatus that includes an image projection lamp operable for a limited number of hours before failure, a light source operable for more than the limited number of hours before failure, and a device to project digital images onto a viewing surface using selectively either the light source alone or at least the image projection lamp.

Implementations may include one or more of the following features. The light source alone is selectively usable to display information. The information relates to an audio-only function. The information comprises a menu. The device projects the digital image from the light source alone after a shorter delay from turn on than when the device projects the digital image from at least the image projection lamp.

In general, in another aspect, the invention features an apparatus that includes a color wheel to use in an image projector, the wheel comprising a transparent portion to receive light from one side of the color wheel and to pass only light of a first spectral band, and a reflective surface to reflect light received from an opposite side of the color wheel.

Implementations may include one or more of the following features. The reflective surface lies at other than normal to an optical axis of the light received by the transparent portion. The reflective surface lies in a plane that is not normal to an axis of the light received from the opposite side of the color wheel.

In general, in another aspect, the invention features an apparatus that includes multiple lens segments arranged in a pattern to receive light from an input beam and to pass it to an output optical path, and a mirror segment in the pattern to reflect light from a second input beam to the optical path. The second input beam is received along an input optical path that is at an angle to the output optical path.

In general, in another aspect, the invention features an apparatus that includes a polarization conversion system (PCS) to use in an image projector, the PCS comprising a light wave retarder layer, a reflective polarizer layer on one side of the retarder layer, and a pattern of mirrors and gaps between mirrors, the pattern being on a second side of the retarder layer, the gaps to pass light from light sources arranged on the second side of the retarder layer, the reflective polarizer to reflect at least portions of the light passed from the light sources, the mirrors to reflect at least portions of the light reflected from the polarizer.

In general, in another aspect, the invention features an apparatus that includes a lamp to use in an image projector, the lamp comprising a light source having (a) a broader spectrum and (b) a reflector to produce a beam along an output optical axis using the broader spectrum light, and a source of light having a narrower spectrum, the broader spectrum containing the narrower spectrum, the source of narrower spectrum light aimed through the reflector along the output optical axis.

Implementations may include one or more of the following features. The broader spectrum light source comprises a high-energy discharge lamp. The narrower spectrum source comprises a light emitting diode. The narrower spectrum source comprises a laser. The source of narrower spectrum light is pulsed.

In general, in another aspect, the invention features a lamp comprising a filament to emit red light and infrared light, and a reflective structure that relatively preferentially reflects infrared light emitted by the filament back to the filament and relatively preferentially reflects red light away from the filament.

Implementations may include one or more of the following features. The reflective structure comprises two reflectors defining two different three-dimensional geometric figures. The inner reflector is elliptical. The outer reflector is spherical. The filament comprises tungsten. The reflective structure comprises two reflectors, one inside the other. The reflective structure comprises a cold mirror. The cold mirror is elliptical. The reflective structure comprises an IR reflector. The IR reflector is spherical. The reflective structure comprises a hot mirror. The lamp of claim also comprises a light pipe to receive at least some of the red light that is relatively preferentially reflected.

In general, in another aspect, the invention features an apparatus that includes a light processor including a color wheel having a light passing portion and a reflective surface to (a) reflect a first amount of light having a narrower spectrum from the reflective surface of the color wheel, (b) combine the reflected narrower spectrum light and light having a broader spectrum to generate output light, the broader spectrum light including a second amount having the narrower spectrum, and (c) deliver light including the first amount and the second amount of the narrower spectrum light; an image projection lamp to produce the light having the broader spectrum and operable for a limited number of hours before failure; a light source to produce the narrower spectrum light and operable for more than the limited number of hours before failure; and a device to project digital images onto a viewing surface using selectively either the narrower spectrum light source alone or the light including the first amount and the second amount of the narrower spectrum light.

In general, in another aspect, the invention features a lamp comprising a filament to be heated to produce light, and structure to reflect portions of the light back to the filament to increase the energy level of the filament and to permit light of a selected band to exit the lamp. In some implementations the selected band comprises red light.

Other features of the invention will become apparent from the following description and the claims.

DETAILED DESCRIPTION

Figure 1:
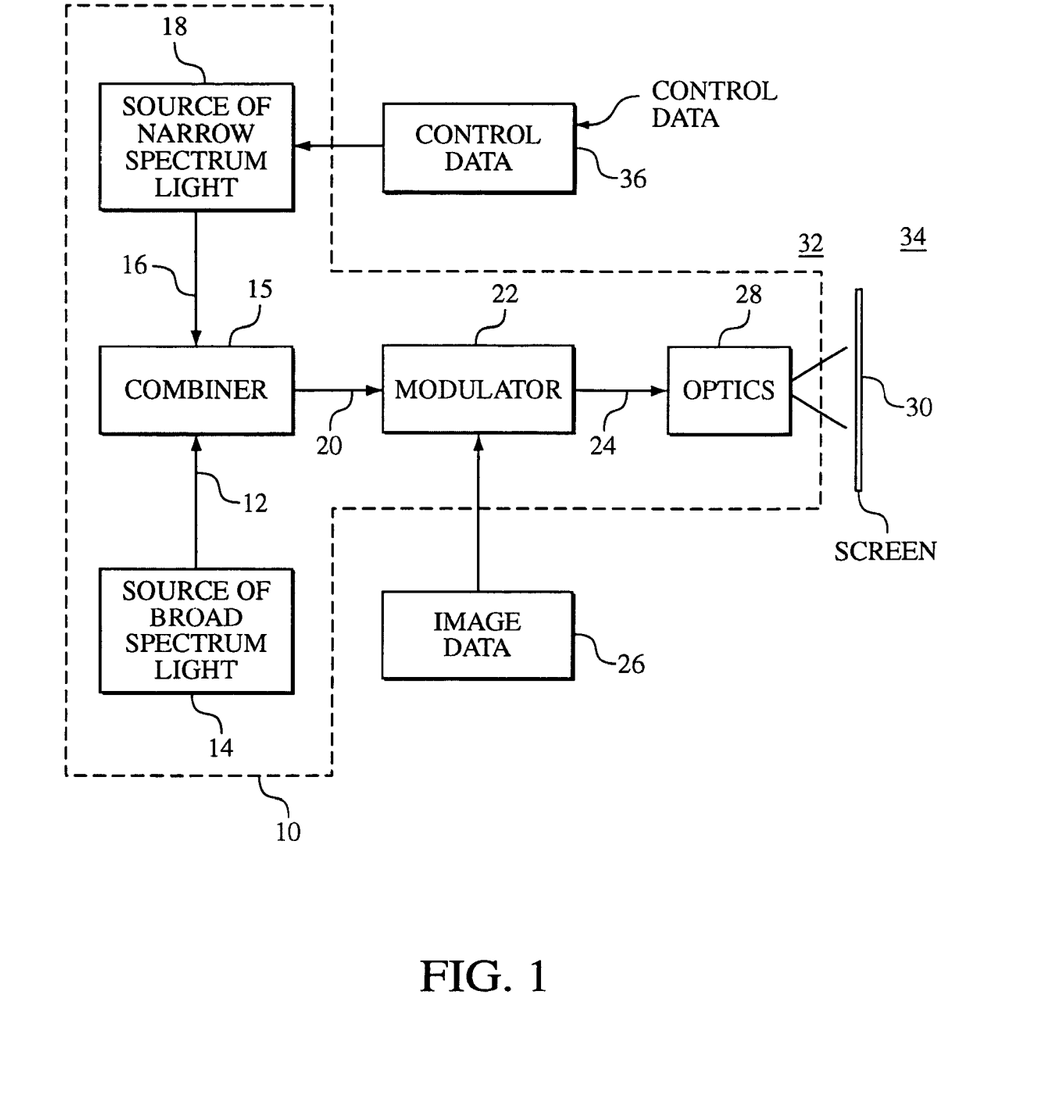
FIG. 1 is a block diagram.

As shown in FIG. 1, in an image projector 10, light 12 from a broader spectrum light source 14 is combined in a combiner 15 with light 16 from a narrower spectrum light source 18 to produce output light 20 having selected spectral characteristics. The output light is processed by a modulator 22 to produce modulated light 24 in accordance with information from a source of image data 26. The modulated light is passed through projection optics 28 and projected onto a viewing screen 30. A source of control data 36 controls the image data that is presented to the modulator.

Figure 11:
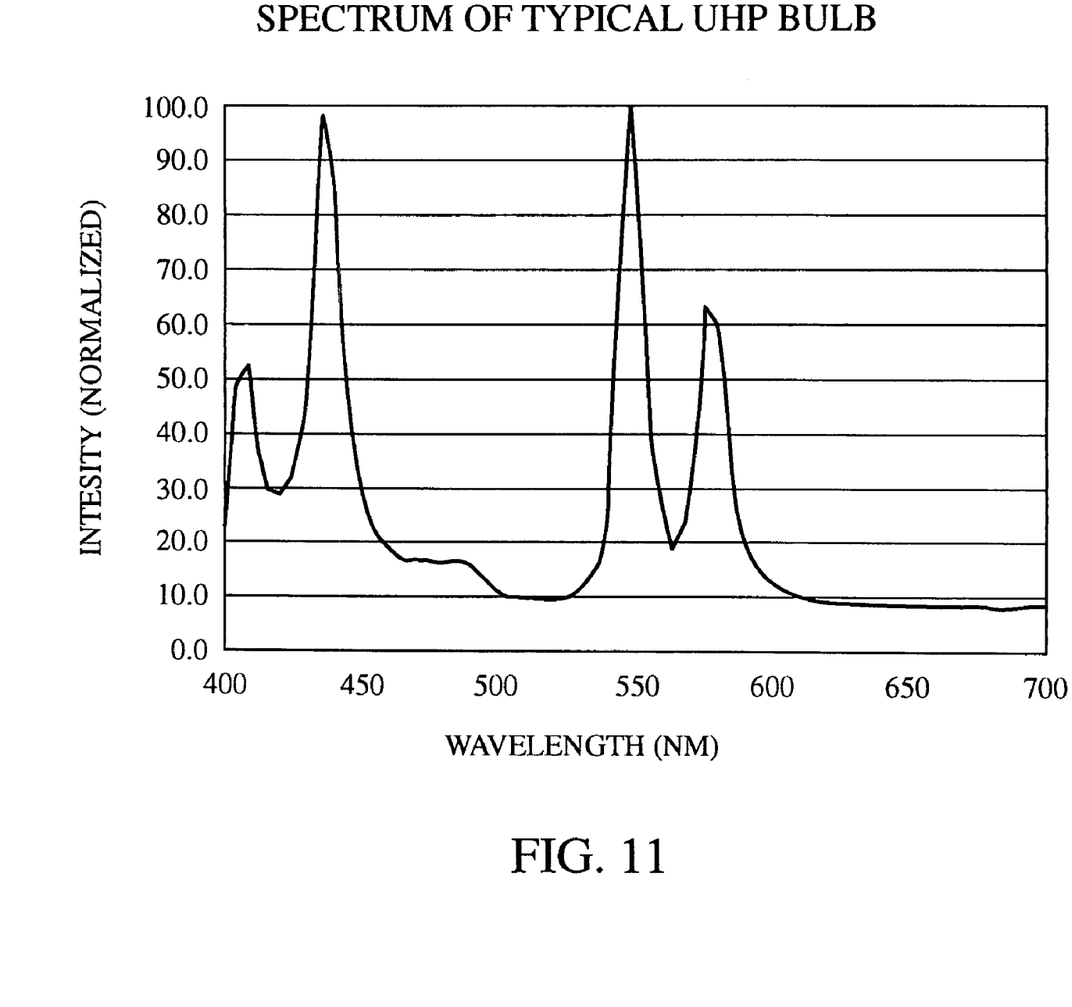
FIG. 11 shows an example spectrum of a UHP lamp.

In some examples, the source of broader spectrum light is a UHP lamp. A spectrum of a UHP bulb is shown in FIG. 11. The narrower spectrum light may be red light that is combined with the broader spectrum light to tend to modify the UHP's imbalance of red light relative to green light and blue light. A wide variety of other spectra may be represented by the broader spectrum light and the narrower spectrum light. The output light may achieve a wide variety of possible selected spectral characteristics; the output light need not have a balanced spectrum, for example, but could achieve other desired qualities.

We use the terms broader spectrum light and narrower spectrum light relatively to one another. By broader spectrum light we mean light that has a spectrum that is broader than the narrower spectrum light. By narrower spectrum light we mean light having a narrower spectrum than the broader spectrum light. Thus, broader spectrum light could be but need not be white light. The narrower spectrum light could lie within the broader spectrum, overlap partially with the broader spectrum or be disjoint with the broader spectrum.

In some examples, the narrower spectrum light is red. By red, we mean light in a range between 600 nm (orangish red) and 780 nm (at the very edge of visibility). A useful red for purposes of the system discussed here is between 620 nm and 640 nm. Red LEDs can be made to cover this useful red range. Red lasers have a narrow bandwidth on the order of 1 nm and can be made at any red wavelength although the shorter wavelengths are more difficult to achieve. For example, 600 nm is very difficult for a red laser, 630 nm is moderate difficulty, and 640 nm is much easier.

The broader spectrum light may, but need not, be white light, by which we mean light that has approximately equal energy at all visible wavelengths or light that has a combination of narrow bands that stimulate the color sensors of the human eye as though it had approximately equal energy at all visible wavelengths.

The source of narrower spectrum light could include a broader spectrum source together with filters to pass only a narrower portion of the broader spectrum to form, in effect, a narrower spectrum source.

The screen 30 may be a front projection screen that reflects light to a viewer on the same side 32 of the screen as the projector or a rear projection screen for which the viewer is on the opposite side 34 of the screen.

The image data from source 26 may be a digital source or an analog source.

The source of narrower spectrum light may be modulated by a source of control data 36. The source of the control data may be a digital signal processor, a microprocessor, an application specific integrated circuit or other device that makes calculations on the input data stream. Or the control data may not be based on the input data stream in some cases. The control data may be directly extracted from the data stream if synchronization information is available. The control data can turn on and off the narrow spectrum light to synchronize with other parts of the image projector system. Certain data such as menu options to be shown to the user, or other text or image information, can be shown by modulator 22 when the narrow spectrum light source 18 is energized, even when the broad spectrum light source 14 is not energized. For example, a menu could be displayed even when images or video are not being displayed.

The image data could be still or video images, for example, associated with multimedia content, or could be user interface screens associated with a computer or other digital devices.

There are a wide variety of ways to arrange for the combining of the narrower spectrum light with the broader spectrum light. The combining may be based, for example, on geometric, temporal, polarization, wavelength, or other features of the system.

Figure 2:
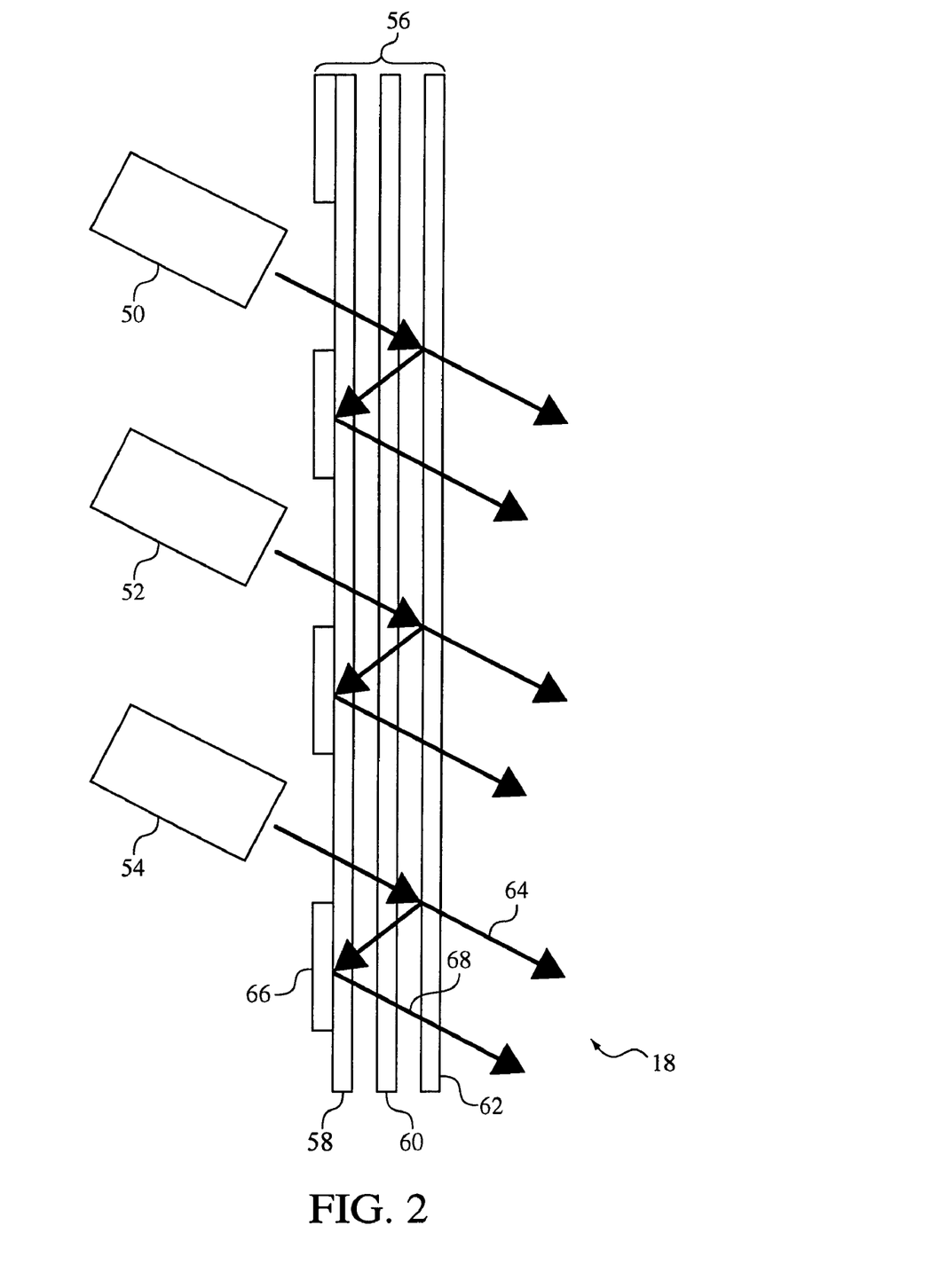
FIG. 2 is a schematic side view of a polarizing sandwich.

FIG. 2 illustrates a polarization conversion system (PCS) that shows how polarization may be used to combine the narrower spectrum light with the broader spectrum light. Conceptually, the system shown in FIG. 2 includes a sandwich that passes red light having a desired polarization (and rotates red light having an undesired polarization) so that it can be included in the output light. In the example shown in FIG. 2, the source of narrower spectrum light 18 includes an array of red light emitting diodes (LEDs) 50, 52, 54 (only one dimension of the array is shown in the figure). The light beams from the LEDs are aimed parallel to one another and at an angle to a surface of a three-layer sandwich 56 that includes a glass substrate 58, a quarter-wave retarder plate 60, and a reflective polarizer sheet 62. The reflective polarizer sheet may be of the type available from MOXTEK, Inc., of Orem, Utah. In one example, the retarder is commercially available in optics catalogs such as Edmund Optics.

The substrate for the retarder could be glass or plastic. The substrate serves the purpose of holding the mirror elements in proper position. The quarter-wave retarder needs to achieve approximately a quarter wave of retardation at the proper wavelength and angle. Unpolarized light of the beams from the LED array is in part 64 passed through the sandwich as light linearly polarized in one direction. The light reflected from the polarizer is the opposite polarization to the light transmitted through the polarizer. The light reflected from the polarizer goes back through the quarter wave plate 60 and onto mirrored segments 66 that have been formed on the front surface of the glass substrate. The light 68 is then reflected back through the quarter-wave plate (thus achieving an aggregate half-wave shift in the polarization of the light) and then through the reflective polarizer sheet.

The selectively polarized light from source 18 is then passed to a polarization beamsplitter (PBS) (not shown) that serves as the combiner 15 of FIG. 1, where the narrower spectrum polarized light is combined with a polarized source of broader spectrum light. Because the polarization of the narrow spectrum light and the polarization of the broad spectrum light can be arranged to be opposite, the polarization beam splitter can combine both light sources without excluding from the output beam the portion of the broader spectrum light that is within the spectral band of the narrower spectrum light. Polarizing beamsplitters generally require opposite polarizations for the incoming beams. These are usually S and P. The output of the polarizing beamsplitter is then a combination of S and P, in other words, unpolarized light. In this sense, the technique of FIG. 2 has the advantage that all of the available red light from both sources is carried into the output beam. The other methods describe below also have the advantage of including in the output beam all or most of the red light from both sources.

Although a particular sandwich 56 is shown in FIG. 2, other numbers and arrangements of optical elements may be able to provide the narrower spectrum light in a selectively polarized form for use in the combiner.

Figure 3:
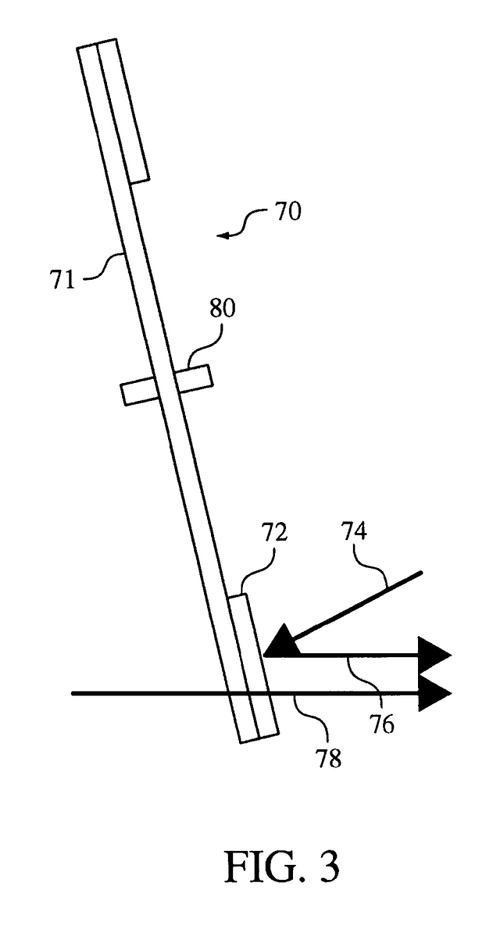
FIGS. 3 and 4 are schematic side views of color wheels.

A second approach for combining uses time separation of light. An example is shown in FIG. 3, which may be used, for example, in digital light processing (DLP) or other single panel projectors that use a spinning color wheel 70. The wheel 70 includes segments 71 containing blue and green filters and (in the places where known wheels have red filter segments) mirror segments 72. An unmodulated source of red light delivers a beam 74 against the mirror segments at appropriately timed moments when the mirror segments are in position to reflect the red light. The source of the red light may be light emitting diodes (LEDs). The red light is reflected to a path 76 that is parallel to a beam 78 from a UHP lamp. The beam 78 passes through the green and blue filters at times when the wheel is rotated to appropriate angles and is blocked by the mirror segments at times when the red light is being reflected.

Figure 12:
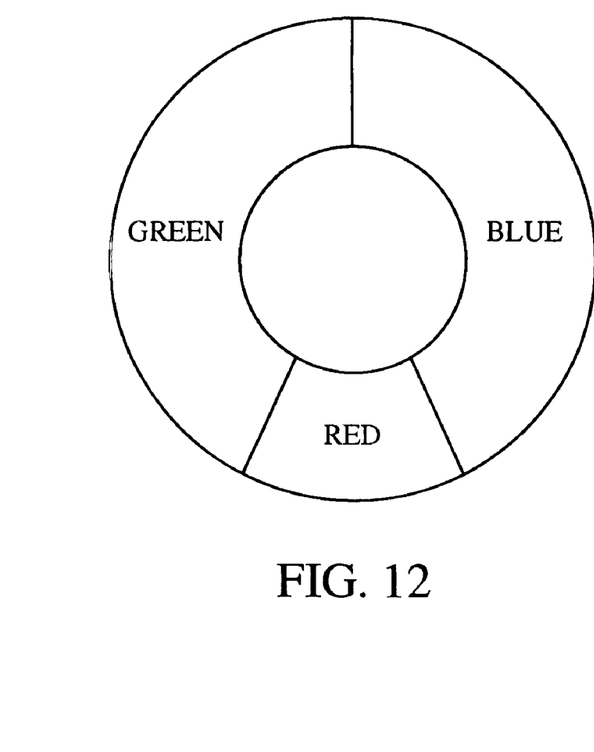
FIG. 12 is a front schematic view of a color wheel.

An example, color wheel, FIG. 12, is circular with a hole in the middle that is about half the diameter of the circle. The size of each color segment is based on the design of the individual system. A typical known system (using only filters) has blue and green each using 105 degrees of the circle, and red using 150 degrees. An example of the system being described here, shown in FIG. 12, can have blue and green each using 165 degrees and red using 30 degrees.

In order to reflect the red light onto the parallel path 76, the mirror is oriented at an angle to the normal to the direction of path 76. In FIG. 3, this is accomplished by orienting the axis of rotation 80 of the wheel at an angle to the direction of path 76. In the example, of FIG. 4, the axis of rotation is parallel to the light path, but the mirror segments 82 are formed at an angle to the plane 84 of the filter segments of the wheel.

Output from the red light source is only useful during the period of time when the color wheel is positioned to pass red light from the red light source to the output beam. Whenever the red light source is active, power is dissipated in the device as heat. If the source can be turned off during the periods of time when its output is not passed to the output beam, less power will be dissipated while maintaining the same useful optical output. The temperature rise in the device is proportional to the average power dissipated in the source. If the source can be shut off for a period of time, the power applied to the source during the time it is active can be increased while keeping the average power applied as a function of time constant. This allows the useful optical output of the red light sources to be increased. Red light sources Such as LED's and lasers have rapid turn on and turn off times and can be used in this way. Conversely, a UHP bulb has a long on/off cycle time (much longer than the rotational period of the color wheel).

Color wheels are typically designed to have large red light segments because the UHP bulbs have low output in the red wavelength band. In FIG. 2, the sizes of the red light segments can be much reduced so that more of the color wheel is available for the green and blue filter segments. If red light from the broadband source is desired in the output beam, a red segment can still be included in the wheel, but some of the wheel space normally dedicated to the red light from the broadband source can be used for the mirror segment.

Figure 4:
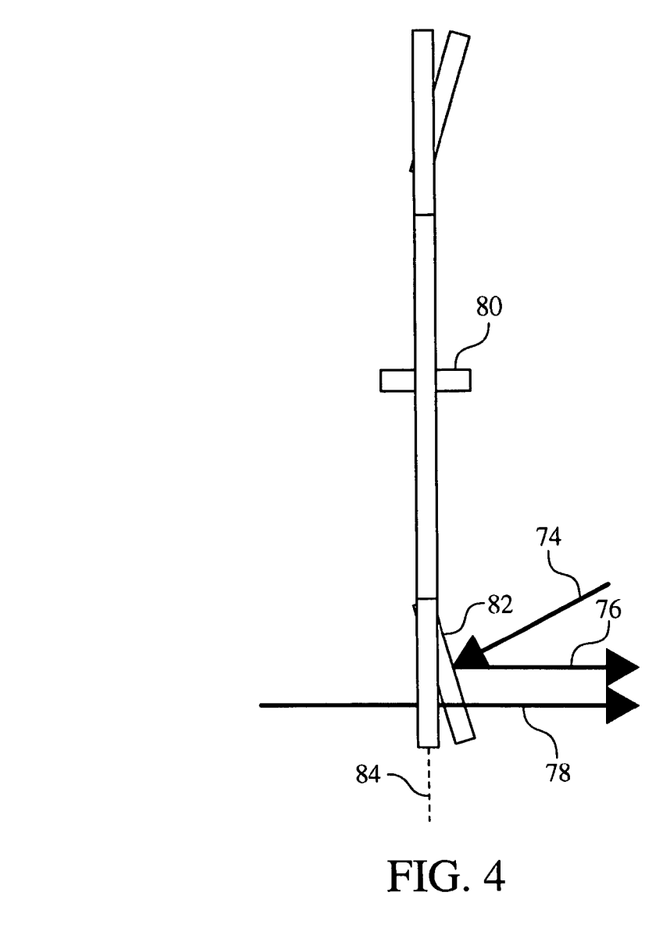

In FIGS. 3 and 4, the UHP lamp is behind (that is, to the left of) the wheel and the red is in front of (to the right of) the wheel. In one example, the red source may be a single high-power red LED combined with collimation lenses to produce the proper beam.

The wheel diameter may be about 2 to 3 inches. The speed of rotation is typically 1 to 6 times the frame rate or about 60 Hz to 360 Hz. A synch signal already exists for the colors, and no additional synchronization signal is needed for the red light. The power and speeds of LED driving can be handled by typical electronic circuits.

In the color wheel examples, the colors occur sequentially in separate periods of time in the output beam, for example, green, then blue, then red. Thus the output beam differs from implementations in which the broadband light as a whole is combined with a narrow band red light source. The feature of pulsing of the red light rather than running the narrow band red light source continuously may also be applied to the cases in which the narrow band light is being combined directly with the broadband light.

Figure 5:
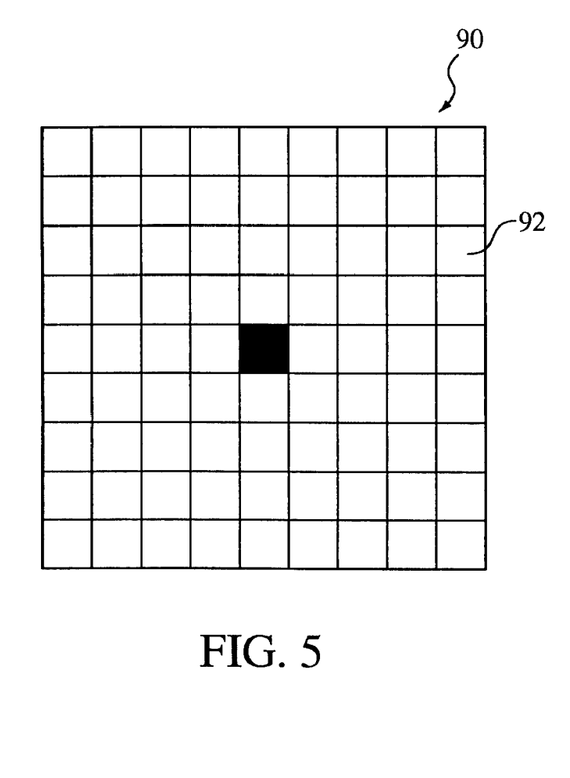
FIGS. 5 and 6 are schematic top and side views of a lens array.
Figure 6:
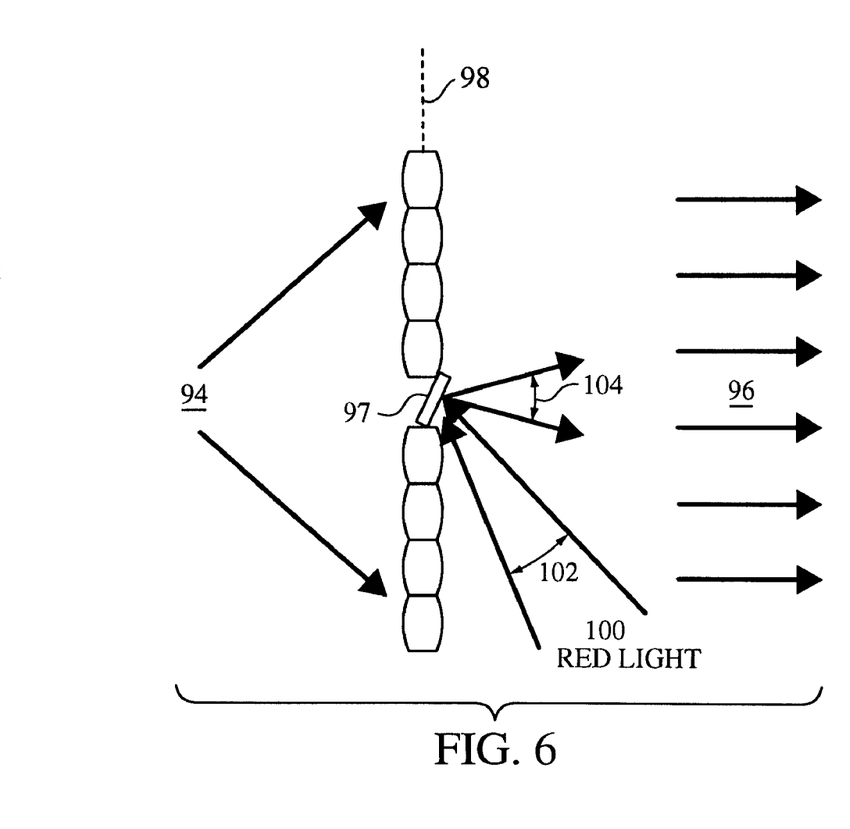

Combining of light may also be based on geometry. As shown in FIGS. 5 and 6, a fly's eye lens 90 has an array of lenses 92 arranged to collimate light 94 received from a UHP lamp and direct it in a beam 96. One (or in some examples, more than one) of the lenses is replaced by a mirror 97 canted at an angle to the plane 98 of the array. Red light 100 is directed from multiple angles 102 against the reflective surface of the mirror and reflected over a range of angles 104 generally in the direction of the beam 96. Thus, the narrower spectrum light and the broader spectrum light are combined by the lens array. In the technique of FIGS. 5 and 6, it may be necessary to include an additional integration lens (or multiple mirrored segments) to make the red light more uniform. If multiple red sources are used, they can be combined into one beam prior to reflection from the mirror segment. Multiple reflective cells can be used, but more cells will cause more occlusion of the main beam. The red sources and associated collimation optics should be placed as close as possible to the main beam, but should not block the main beam.

Figure 7:
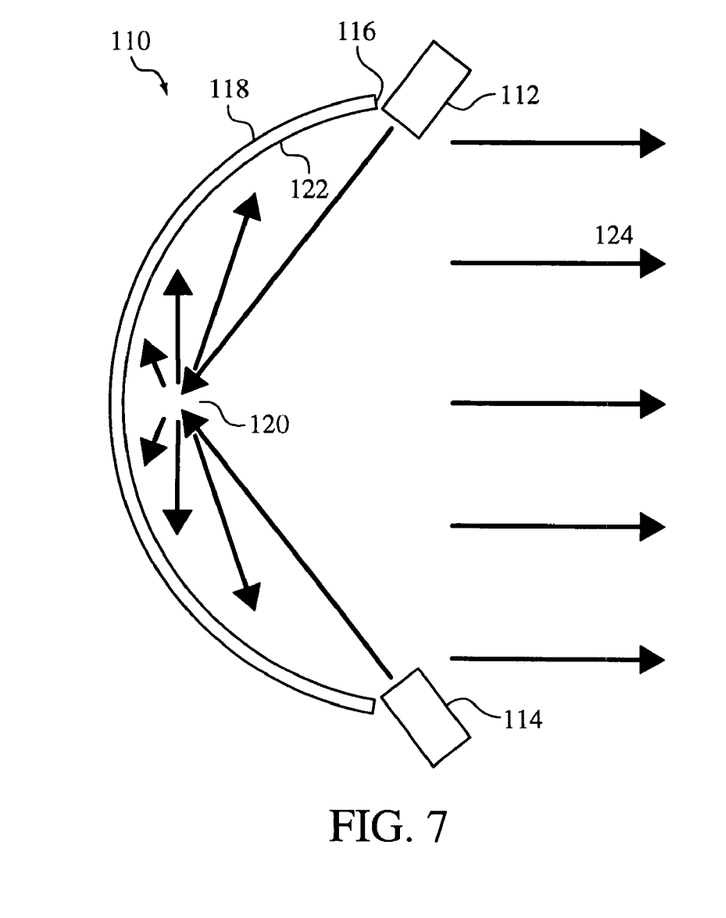
FIGS. 7 and 8 are schematic side sectional views of UHP lamps.

Another combining approach that uses geometry is shown in FIG. 7. The broader spectrum source is an arc lamp 110 (such as a UHP lamp). A ring of focused red light sources 112, 114 (for example, red light provided by LEDs or lasers) are arranged around the periphery 116 of the parabolic reflector 118 of the lamp. Each of the red light sources is aimed at the arc 120 of the lamp. Together, the red light sources flood the arc with red light. The arc generates only a small amount of red light. Based on the physics of light interacting with matter, it is predictable that the arc will only weakly absorb red light. In other words, the plasma arc will not absorb much red light because it does not generate much red light. Because the added red light emanates from the same region as the arc, the combined broader spectrum light and red light are reflected from the same inner surface 122 of the reflector to from the output light 124 having an enriched level of red light compared to what would have been generated by the arc alone.

Figure 8:
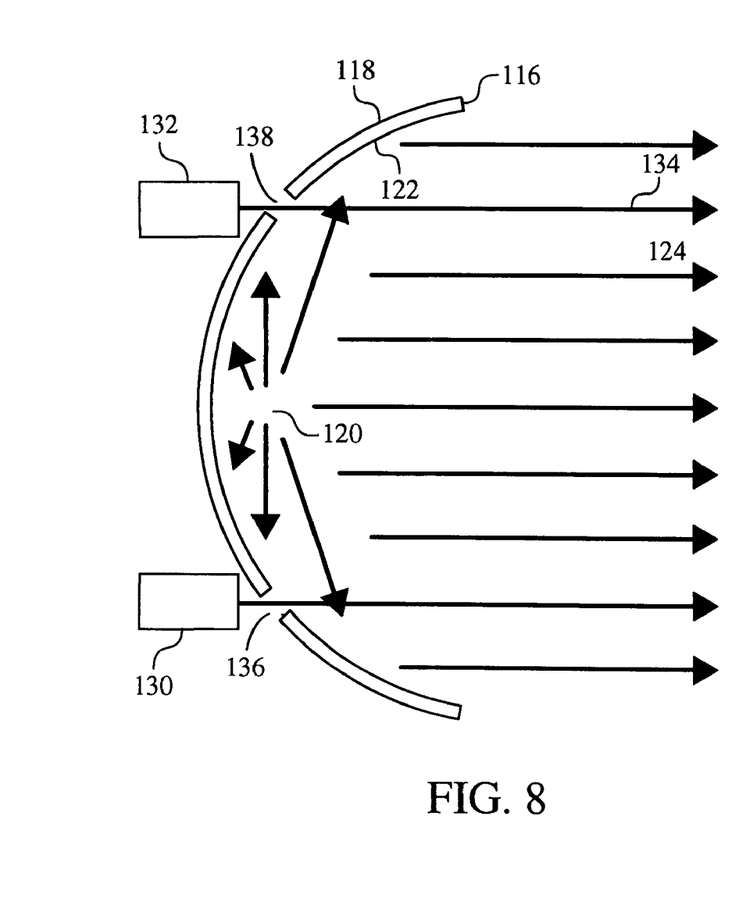

Another approach for combining red light at a UHP lamp is shown in FIG. 8. In this case, the red light is injected parallel to the reflected output beam of the lamp using a ring of laser light sources 130, 132 arranged behind and around the reflector. The beams of light 134 from the lasers passes through apertures 136, 138 in the reflector. Because lasers can be well-collimated with a small beam diameter, their light can be directly introduced through small holes in the reflector without requiring additional reflection or collimation. A fly's eye integrator (not shown) downstream of the lamp can be used to make the red light uniform across the beam.

Figure 9:
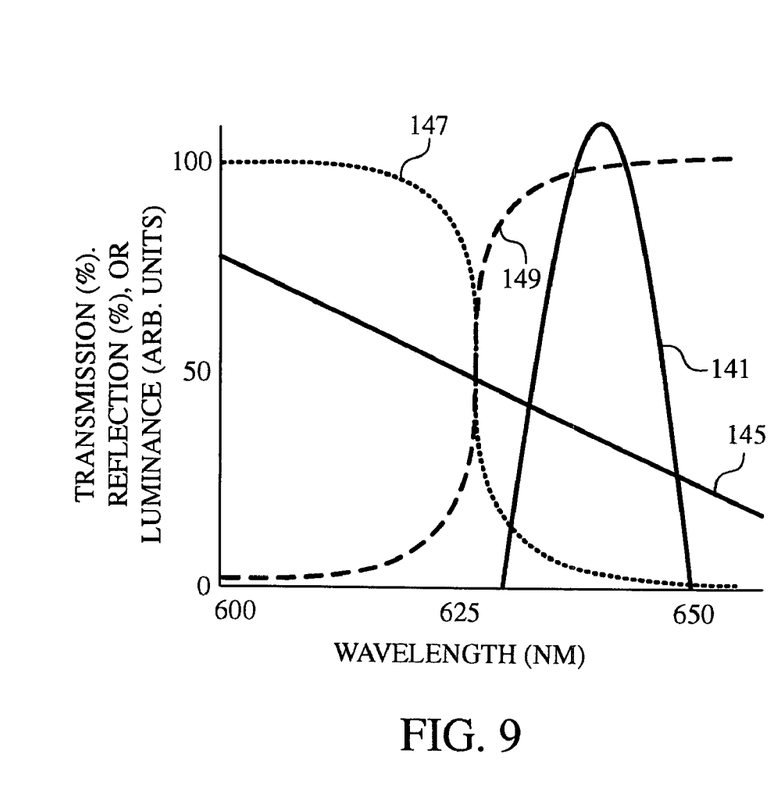
FIG. 9 shows wavelength curves.
Figure 10:
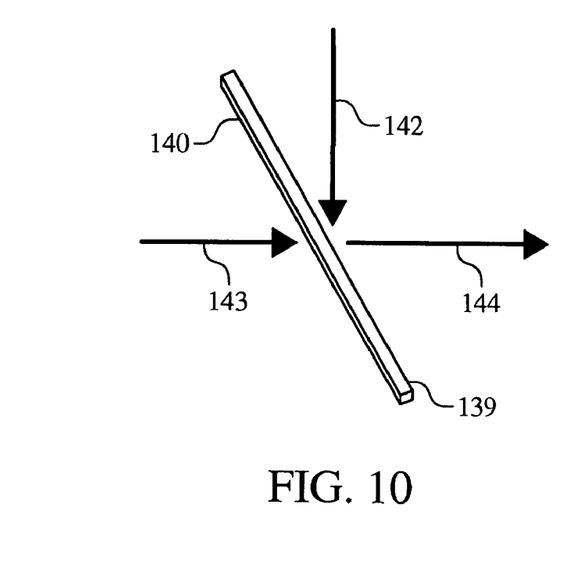
FIG. 10 is a schematic side view of a dichroic beamsplitter.

In some implementations, wavelength may be used as the basis for combining as shown in the example of FIGS. 9 and 10. A dichroic beamsplitter 139 has an interference coating 140 that transmits only light within the short wavelength red band. It reflects light at larger wavelengths, including long wavelength red light. By arranging a source of long-wavelength red light (having a spectrum 141) to produce a beam 142 that strikes the beamsplitter surface at a 45 degree angle, and a UHP lamp to deliver a beam 143 at an angle of 90 degrees to the red beam, the two beams are combined in an output beam 144. This uses the most effective spectral regions from both light sources. FIG. 9 shows the spectrum 145 of the UHP lamp, the spectrum 147 that is passed by the beamsplitter 139, and the spectrum 149 that is reflected by the beamsplitter. Another way of performing this function is to use a narrow interference notch filter if the long wave red source has a very narrow bandwidth.

For both front and rear projection systems, these techniques (and other implementations) provide greater brightness of the image on the screen. Up to approximately twice the brightness might be achievable. For rear-projection, the techniques help enable the use of UHP-based systems such as LCOS or DMD projectors in systems that formerly used cathode-ray tubes (CRTs). UHP systems are potentially lower cost, lighter, and smaller than the CRT systems.

As mentioned earlier, a system with red light addition could provide an "instant-on" display (red only) for data or menu displays. The audio only function of an entertainment system could use the red display. The red display mode could provide long-life even with many on-off cycles because it does not use a short-life light source such as a UHP lamp.

Figure 13:
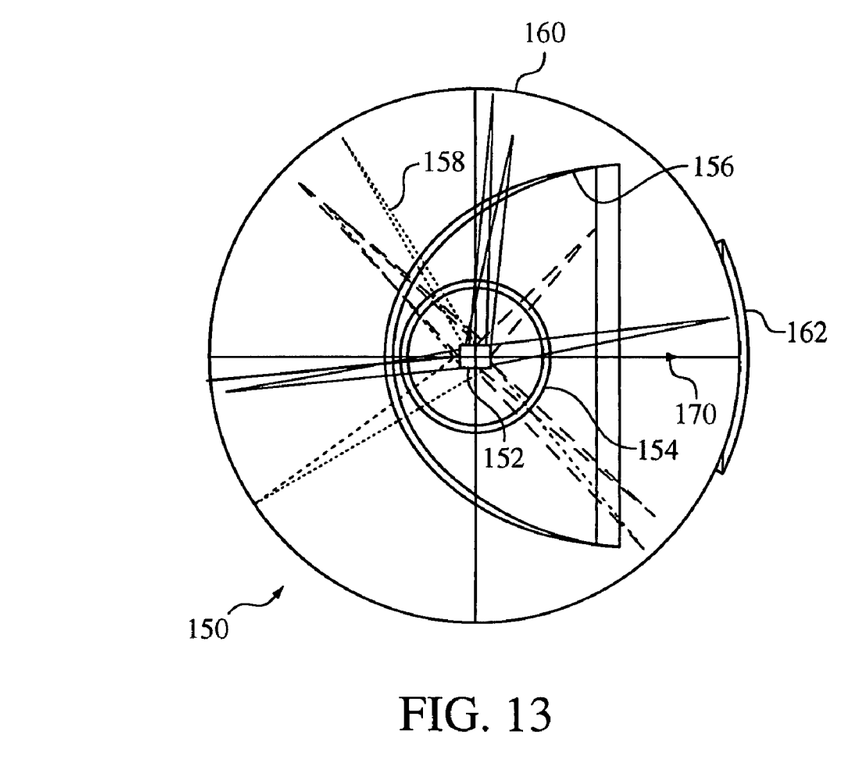
FIGS. 13 and 14 are schematic side views of a lamp.

In addition to the possible sources mentioned earlier, the source of narrower spectrum light could be an appropriately modified tungsten lamp 150 (shown schematically in cross section in FIG. 13). A wound filament 152 at the center of the bulb is surrounded by a spherical transparent glass envelope 154. An elliptical reflector 156 bearing a cold mirror coating is positioned around the filament. A cold mirror coating is one that reflects the colder red light from the filament and transmits the hotter infra-red (IR) light. A variety of cold mirror coatings are possible. A cold mirror may also be constructed of alternating layers of low index of refraction and high index of refraction materials.

Hypothetical rays 158 of the transmitted IR light are shown in dashed line. An outer sphere 160 centered on the filament bears a metal coating (e.g., gold) to reflect IR light back towards the filament, which in effect returns (recycles) some of the heat (energy) produced by the bulb to the filament instead of dissipating it. The outer sphere 160 has a hole in the direction in which the elliptical reflector directs the red light. A cover 162 having a spherical surface caps the hole. The cover 162 bears a hot mirror coating, which reflects the hot IR light and transmits the colder red light. The hot mirror coating may be in the form of a dielectric stack of alternating high index and low index layers.

During operation, red light is reflected by the elliptical reflector through the cover along the axis 170. IR light is reflected back from the cover 162 toward the filament rather than being dissipated as heat. The heat energy that would otherwise be dissipated is used to increase the operating temperature of the filament, improving its energy conversion efficiency.

Ray trace modeling of the lamp of FIG. 13 indicates that the structure is about four times more efficient in its use of energy than a conventional tungsten bulb.

Figure 14:
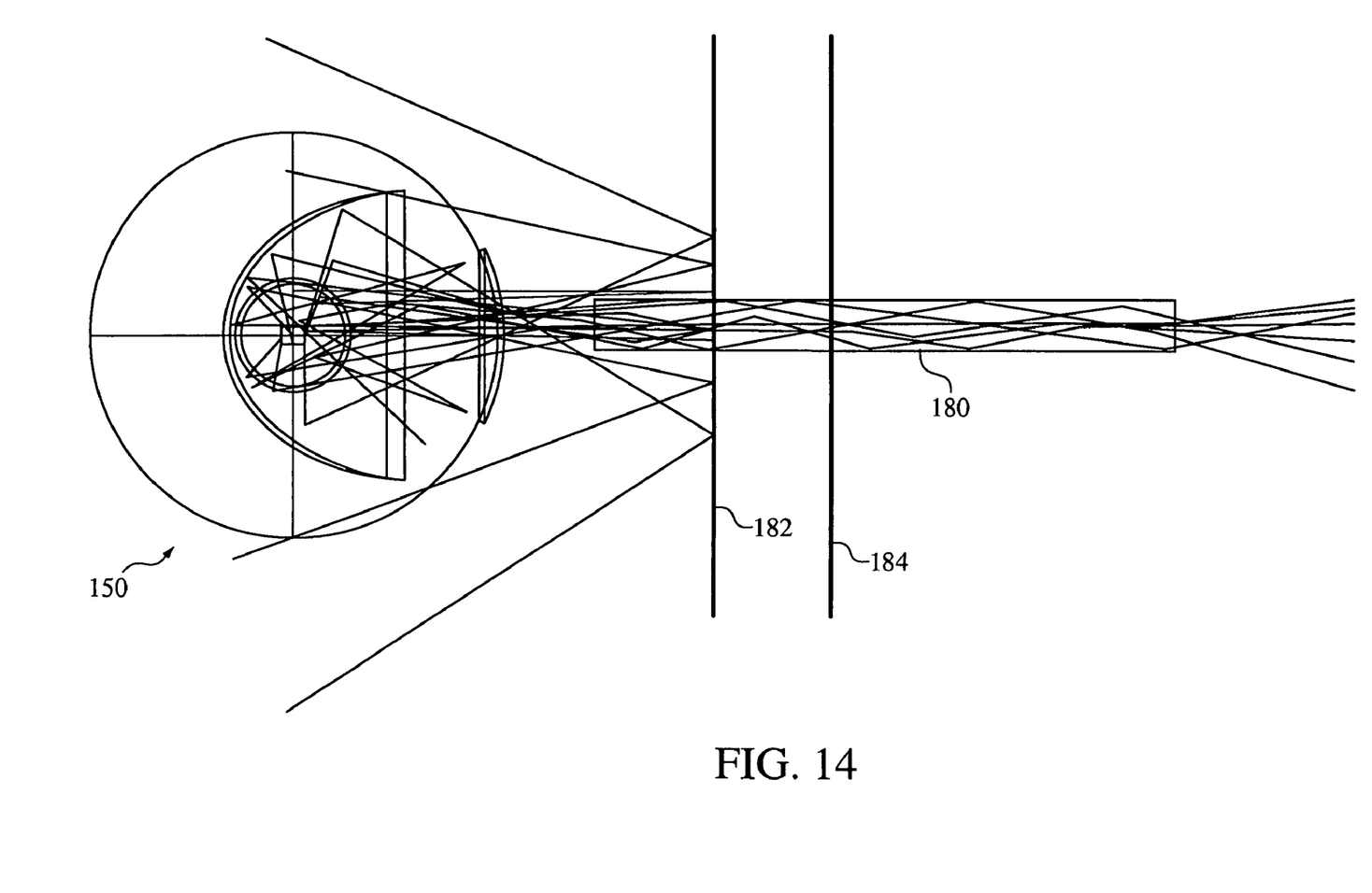

As shown in FIG. 14, the output beam of red light from the lamp 150 may be passed through apertures in two baffles to remove stray light rays and along a light pipe 180 to a place where the red light is to be used. Light-pipe coupling efficiency for a high power lamp is relatively low. As a result, the red lamp may have to be used directly, by locating the lamp within the projector body in the case of a digital projector, rather than with the lamp and the projector head connected by a light pipe as in FIG. 14. When a lamp 150 is used to generate red light, flat dichroic beam splitters may be used to combine the red light with light from high efficiency blue and green arc lamps. Other methods, such as fiber optics, could be used. It may also be possible to obtain narrow band blue light and green light from the tungsten lamp.

The elliptical mirror is used when the red light needs to be focused to a point, for example, when the output light is delivered into a light guide or is focused onto a color wheel in a digital light processing (DLP) projector. In other implementations, a parabolic minor may be used when the red light needs to be formed into a collimated beam, for example, when the light will be used in a conventional LCD or LCOS projector.

A typical UHP lamp will operate only for a limited number of hours before failure. Other light sources, such as LEDs or lasers, will operate for many more hours without failure. In addition to sometimes combining light from the two sources in the ways described above, for example, to project digital images onto a viewing surface, the light from the longer life source could be used separately at other times. The system may be configured to permit the longer life source to be used alone selectively to display information. The information could relate to an audio-only function of a multimedia system. The information could be a menu to permit a user to control the functions and operation of the system. In this way, the effective life of the shorter life lamp may be extended because it is not used at times when only a menu or other control information needs to be shown to the user.

In some cases, longer life lamps such as LEDs and lasers also have the property of turning on with a shorter delay than shorter life, e.g., UHP, lamps. This is advantageous in enabling a projector to respond more rapidly to user actions.

Other implementations are within the scope of the following claims.

For example, a diffraction grating might be used to add red light, although it may be difficult to concentrate the light from the grating into a single usable beam. Holographic gratings may make the technique feasible.

What is claimed is:

1. An apparatus comprising
   an image projection lamp operable for a limited number of hours before failure, the image projection lamp emitting light having a spectrum;
   a light source operable for more than the limited number of hours before failure, the light source emitting light having a spectrum narrower than the spectrum of the light emitted from the image projection lamp; and
   a device to project digital images onto a viewing surface using the light source alone.

2. The apparatus of claim 1 in which the light source is usable to display information.

3. The apparatus of claim 2 in which the information relates to an audio only function.

4. The apparatus of claim 2 in which the information comprises a menu.

5. The apparatus of claim 1 in which after the device is turned on, the light source begins to emit light more quickly than the image projection lamp.

6. The apparatus of claim 1 in which the device uses selectively either the light source alone or the light source in combination with the image projection lamp.

7. The apparatus of claim 1 in which the device first projects the digital image from the light source and then after a period of time projects the digital image from the light source and the image projection lamp in combination.

8. The apparatus of claim 1 in which the image projection lamp comprises a UHP lamp.

9. The apparatus of claim 1 in which the light source comprises an LED.

10. The apparatus of claim 9 in which the light source comprises a red LED.

11. The apparatus of claim 1 in which the light source comprises a laser.

12. The apparatus of claim 11 in which the light source comprises a red laser.

* * * * *